3,469,011
1,1,2-TRIFLUORO-2-CHLOROETHYL-DIFLUORO-
METHYL ETHER AS AN ANESTHETIC AGENT
Ross C. Terrell, Summit, N.J., assignor to Air Reduction
Company, Incorporated, New York, N.Y., a corporation of New York
No Drawing. Filed Oct. 3, 1966, Ser. No. 583,938
Int. Cl. A61k 13/00; C07c 43/12
U.S. Cl. 424—342  3 Claims

ABSTRACT OF THE DISCLOSURE

This application discloses the novel compound 1,1,2-trifluoro-2-chloroethyl difluoromethyl ether having the formula $CHF_2OCF_2CHFCl$. The compound is prepared by fluorination of the corresponding dichloromethyl ether using fluorinating agents in the presence of pentavalent antimony salts and tetravalent halides as fluorination catalysts. Advantageous preparation of the precursor dichloromethyl ether involves chlorination of the methyl ether by the addition of not more than 1.5 molar equivalents of chlorine. The novel difluoromethyl ether is useful as an anesthetic agent.

---

This invention relates to the new compound 1,1,2-trifluoro-2-chloroethyl difluoromethyl ether having the structural formula $CHF_2OCF_2CHFCl$, its method of preparation, and the use thereof, as an anesthetic.

1,1,2-trifluoro-2-chloroethyl difluoromethyl ether is a volatile, nonflammable liquid, having the following properties: B.P. 56.5° C.; refractive index $N_D^{20}$ 1.3025; specific gravity 25°/25° 1.5167. The compound is extremely stable, does not undergo degradation in the presence of alkali or light and has highly advantageous anesthetic properties. This compound is easily miscible with other organic liquids including fats and oils and has useful solvent properties such as for example as a solvent for fluorinated olefins and other fluorinated materials, such for example as fluorowaxes. It may be used to prepare pastes and dispersions of such materials useful for coatings and the like and may be used as a degreasing agent.

1,1,2-trifluoro-2-chloroethyl difluoromethyl ether is readily prepared by fluorinating the corresponding dichloromethyl ether in the presence of a suitable fluorination catalyst, according to the following reaction equation:

(1) 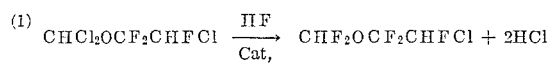

Fluorinating agents useful in carrying out the above reaction are hydrogen fluoride (HF) and antimony trifluoride ($SbF_3$). The fluorination catalysts used comprise pentavalent antimony salts such as $SbF_5$, $SbCl_5$, or tetravalent stannic halides such as $SnCl_4$. When $SbF_3$ is used as the fluorination agent the reaction proceeds advantageously at the boiling point of the product and the product is distilled from the reaction mixture as formed. When hydrogen fluoride is used as fluorination agent the reaction can be carried out at temperatures up to the boiling point of the reaction mixture. Lower temperatures are preferred, as the yields are higher. A temperature of 0°–10° C. is preferred.

The use of the above catalysts is required in order to carry out the fluorination effectively. In the absence of such catalysts the fluorinating agents are inoperative. Preferably the catalyst is used in an amount comprising from ½ to 10% by weight (calculated as $SbCl_5$) of the reaction mixture. Upon completion of the reaction the product is readily separated by distillation.

The precursor dichloromethyl ether employed in the preparation of the new ether is a known compound. However, it may advantageously be prepared by chlorination of 1,1,2-trifluoro-2-chloroethyl methyl ether in accordance with the following reaction equation:

(2) 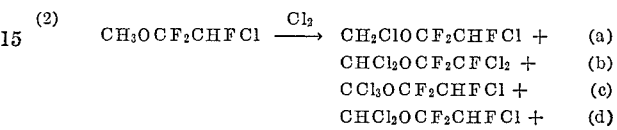

The chlorination advantageously is carried out at temperatures of 20°–40° C. with the addition of not more than about 1.5 molar equivalents of chlorine. The reaction proceeds readily in the presence of incandescent light to yield the desired $CHCl_2OCF_2CHFCl$ which is used in the subsequent fluorination. With the addition of more than 1.5 molar equivalents of chlorine to the reaction mixture there is produced in the reaction product significant amounts of the by-products identified as (b) and (c) in the above reaction equation (2). These are waste by-products which directly reduce the yield of the desired final product $CHF_2OCF_2CHFCl$ that is obtainable from the starting materials. Further, the by-products

and $CCl_3OCF_2CHFCl$, are difficult to remove from the dichloromethyl ether precursor and its removal prior to such further preparation therefore incus substantial additional effort and expense. If the precursor dichloromethyl ether is fluorinated in admixture with the by-product $CHCl_2OCF_2CFCl_2$, the end product is contaminated by the corresponding fluorinated ether $CHF_2OCF_2CFCl_2$ which also is difficult to remove from the desired end product ether; it also possesses mild convulsant properties which necessitate its substantially complete elimination from the end product when intended for anesthetic use. However, by carrying out the chlorination, preferably at 20°–40° C., at a lower conversion by the addition of only 1.5 molar equivalents or less of chlorine, the formation of undesired by-products may be suppressed to as little as about 4% of the reaction product, thereby greatly facilitating the manufacture of the desired ether and greatly increasing the conversion and yield of the process. Preferably at least 1.25 molar equivalents of $Cl_2$ are used. At this lower range the monochloroethyl ether intermediate, $CH_2ClOCF_2CHFCl$, may comprise as much as 60% of the chlorinated intermediate product mixture. However, this intermediate is readily usable by direct rechlorination or rechlorination together with the starting ether, and therefore does not represent loss of the starting material.

The following tabulation in Table I illustrates the respective percentages of the reaction products obtained in the reaction corresponding to the specified amounts of chlorine added.

TABLE I.—PERCENTAGE OF REACTION PRODUCTS OBTAINED CORRESPONDING TO MOLES OF CHLORINE ADDED

| Reaction product | Moles chlorine added | | | | | | | | | |
|---|---|---|---|---|---|---|---|---|---|---|
| | 0.2 | 0.49 | 0.78 | 1.25 | 1.49 | 1.62 | 1.88 | 2.5 | 2.8 | 3.7 |
| $CH_3OCF_2CHFCl$ | 75 | 32 | 19 | 1 | 0 | 0 | | 0 | 0 | 0 |
| $CH_2ClOCF_2CHFCl$ | 25 | 67 | 74 | 63 | 50 | 36 | 20 | 0 | 0 | 0 |
| $CHCl_2OCF_2CHFCl$ | | 1 | 6 | 33 | 46 | 57 | 64 | 52 | 25 | 0 |
| $CH_2ClOCF_2CFCl_2$ | | | 1 | 2 | 1 | 1 | 0 | 0 | 0 | 0 |
| $CHCl_2OCF_2CFCl_2$ | | | | 0.5 | 1 | 3 | 12 | 20 | 20 | 2 |
| $CCl_3OCF_2CHFCl$ | | | | 0.5 | 2 | 3 | 4 | 23 | 33 | 10 |
| $CCl_3OCF_2CFCl_2$ | | | | | | | 5 | 5 | 22 | 88 |

The following examples illustrate the preparation of the new compound.

EXAMPLE I

Preparation of the intermediate $CHCl_2OCF_2CHFCl$

To a 3-necked round-bottomed flask fitted with a "Dry Ice" condenser, a fritted glass gas inlet tube, a thermometer, and a stirrer, was charged 1,180 g. (8 moles) of $CH_3OCF_2CHFCl$. After flushing the system with nitrogen, chlorine gas was added via the inlet tube while the reaction was stirred and illuminated with a 300 watt incandescent lamp. The chlorination was rapid and exothermic and the reactor was cooled to hold the temperature between 30° and 35° C. The effluent gases were lead from the top of the condenser to a water scrubber which was titrated at intervals with standard base. When a total of 1.45 moles of HCl per mole of ether was titrated the reaction was stopped. The crude product obtained weighed 1,566 g. which corresponded to the addition of 1.41 moles of chlorine per mole of the starting ether. The product was flash distilled to yield 1,480 g. of product which had the following composition as determined by vapor phase chromatography:

45.3% $CH_2ClOCF_2CHFCl$
50.5% $CHCl_2OCF_2CHFCl$ plus a small amount of $CH_2ClOCF_2CFCl_2$
1.8% $CHCl_2OCF_2CFCl_2$ and
2.1% $CCl_3OCF_2CHFCl$ Fractional distillation of this mixture using a 5 x 120 cm. column packed with ¼ in. Penn State packing yielded 670 g. of product containing 95% $CH_2ClOCF_2CHFCl$ and 5% $CHCL_2OCF_2CHFCl$; B.P. 55°–60° C. at 100 mm., $N_D^{20}$ 1.3748–1.3795; and 670 g. of $CHCl_2OCF_2CHFCl$ (95% pure, containing 5% $CH_2ClOCF_2CFCl_2$); B.P. 60° C. at 100 mm., $N_D^{20}$ 1.3870–1.3875. The still bottoms were comprised mostly of $CCL_3OCF_2CHFCl$ and and $CHCl_2OCF_2CFCl_2$.

EXAMPLE II

Preparation of $CHF_2OCF_2CHFCl$

To a mixture of 2,172 g. (10 moles) $CHCl_2OCF_2CHFCl$ prepared as described in Example I (containing approximately 5% $CH_2ClOCF_2CFCl_2$) and 40 g. (2% by weight) $SbCl_5$ was added anhydrous hydrogen fluoride while the temperature was maintained at 0±5° C. The reaction was carried out in a 3-necked stainless steel flask fitted with a stainless steel stirrer, a thermocouple well and a copper "Dry-Ice" condenser. The amount of hydrogen fluoride added was measured by titration of the HCl given off. At the end of the reaction (total HCl evolved: 1.98 mole per mole of starting ether) the mixture was poured into water and the organic layer (1,803 g., $N_D^{20}$ 1.3080) recovered. The crude product was flash distilled in a 60 x 2 cm. column packed with ¼ in. Penn State packing giving 1,594 g. of substantially pure $CHF_2OCF_2CHFCl$, B.P. 56°–57° C. By further distillation 1,450 g. of the pure ether were obtained, B.P. 56.5, $N_D^{20}$ 1.3030.

*Analysis.*—Calc.: C, 19.5%; H, 1.08%; Cl, 19.2%. Found: C, 19.66%; H, 1.22%; Cl, 18.65%.

The use of substantially pure $CHCl_2OCF_2CHFCl$, free of the minor amount of $CH_2ClOCF_2CFCl_2$, in the method as carried out above gives essentially the same results.

EXAMPLE III

To a stirred mixture of antimony trifluoride (350 g., 5.95 equivalents) and antimony pentachloride (10 g.) in a stainless steel flask was added a total of 600 g. of $CHCl_2OCF_2CHFCl$. The ether was added slowly, keeping the reaction temperature at 60°–70° C. The product was distilled from the reaction mixture as it was formed. The total distillate (450 g.) was washed with cold 2 N base and dried over $K_2CO_3$ to give 400 g. of crude ether.

A total of 3454 g. of ether reacted in this manner gave 2,448 g. of crude product. Fractional distillation gave 1,715 g. of pure product, B.P. 57° C., $N_D^{20}$ 1.3030.

1,1,2-trifluoro-2-chloroethyl difluoromethyl ether exhibits anesthetic properties in mammals and is extremely effective for inducing and maintaining anesthesia in laboratory animals, such as mice, rabbits, dogs, and monkeys and in humans, when administered by inhalation. The agent is non-flammable in oxygen over the entire concentration range attainable at atmospheric pressure. It lends itself to effective use as an inhalant anesthetic in respirable mixtures containing life-supporting concentrations of oxygen. In addition, studies with the agent have shown that it is highly potent, affords good muscular relaxation, is nontoxic, produces minimal irritation and secretions, possesses a high margin of safety, affords rapid induction and recovery, affords ease of control of levels of anesthesia, and is compatible with ancillary drugs commonly used in connection with anesthesia, including muscle relaxants, thiopental, secobarbital, morphine, meperidine and atropine.

Illustrative of the effectiveness of the agent are the tests conducted with mice in which separate groups of five mice were placed in 1 liter jars previously flushed with oxygen and charged with varying predetermined amounts of the agent. These tests showed the agent to be an effective anesthetic at concentrations as low as 1.25% by volume. At higher concentrations reduction of the induction time occurred, for example at 1.90% induction occurred in approximately 1.25 minutes and at 2.5% concentration in about 0–0.60 minutes. After 10 minutes exposure to such respirable atmospheres the test animals were withdrawn and recovered promptly, the recovery for example occurring almost immediately at the 1.25% concentration level and after about 0.3 minutes and 0.60 minutes after exposure at the 1.90% and 2.50% anesthetic levels respectively.

The open-drop method and the closed-system with face mask were employed for administration of the agent in connection with other test animals. Tests were carried out with monkeys utilizing a mean total dose of 1.65 ml./kg./hr. during a series of ½ hour anesthesias. The mean induction time was 2.35 minutes and the recovery time 3.60 minutes. The histopathology of liver tissue taken from monkeys subjected to two anesthesias showed the livers to be essentially normal.

The effectiveness of 1,1,2-trifluoro-2-chloroethyl difluoromethyl ether also has been demonstrated clinically for surgical anesthesia. Clinically the agent may be administered by any of the well known techniques used for administration of general inhalation agents, such as the open-drop, semi-closed, and closed systems. The agent is stable in the presence of carbon dioxide absorbents used in closed or semi-closed circuit anesthesia. In general, concentration of the agent of from 0.5 to 5.0% by volume in the respirable mixture have been found suitable for induction and maintenance. The agent has been used with only oxygen for induction and maintenance after premedication with only meperidine and scopolamine and also for maintenance after induction with thiopental, as is commonly done in using other known inhalant anesthetics. Advantageously the agent may also be used in conjunction with other inhalant anesthetics such as nitrous oxide. Nitrous oxide, which is of low potency and not normally effective by itself for deep surgical anesthesia, when used in conjunction with 1,1,2-trifluoro-2-chloroethyl difluoromethyl ether at concentrations in the order of 50% of the inhalant mixture, permits effective use of 1,1,2-trifluoro-2-chloroethyl difluoromethyl ether at concentration levels of 0.5–2.0% and provides highly satisfactory anesthesias. Some of the advantages in the use of 1,1,2-trifluoro-2-chloroethyl difluoromethyl ether with nitrous oxide in the proportions above mentioned, with oxygen are, lower cost of anesthesia, greater analgesia, better relaxation and a more controllable anesthetic mixture for use in closed circle systems where high concentrations of 1,1,2-trifluoro-2-chloroethyl difluoromethyl ether could accumulate.

I claim:
1. An inhalant anesthetic composition comprising 1,1,2-trifluoro - 2-chloroethyl difluoromethyl ether and oxygen in suitable proportions for the production of anesthesia.
2. The method of anesthetizing a warm blooded air breathing mammal which comprises administering an effective amount of 1,1,2-trifluoro - 2-chloroethyl difluoromethyl ether as a general inhalation anesthetic to said mammal.
3. The method of producing anesthesia in a human subject which comprises administering to said subject by inhalation an anesthetic amount of 1,1,2-trifluoro-2-chloroethyl difluoromethyl ether to produce the desired depth of anesthesia while at the same time administering life-supporting concentrations of oxygen.

References Cited
UNITED STATES PATENTS 2,992,276   7/1961   Weinmayr.
3,264,356   8/1966   Larsen.

ALBERT T. MEYERS, Primary Examiner

J. D. GOLDBERG, Assistant Examiner

U.S. Cl. X.R.
260—614